(12) United States Patent
Chen et al.

(10) Patent No.: US 8,754,583 B2
(45) Date of Patent: Jun. 17, 2014

(54) MULTI-LEVEL ADAPTIVE CONTROL CIRCUITRY FOR DEEP PHASE-CUT DIMMING COMPACT FLUORESCENT LAMP

(75) Inventors: Timothy Chen, Aurora, OH (US); James K Skully, Willoughby, OH (US)

(73) Assignee: Technical Consumer Products, Inc., Aurora, OH (US)

( * ) Notice: Subject to any disclaimer, the term of this patent is extended or adjusted under 35 U.S.C. 154(b) by 178 days.

(21) Appl. No.: 13/353,580

(22) Filed: Jan. 19, 2012

(65) Prior Publication Data
US 2013/0187557 A1  Jul. 25, 2013

(51) Int. Cl.
H05B 41/14  (2006.01)

(52) U.S. Cl.
CPC ........................................ H05B 41/14 (2013.01)
USPC .................... 315/200 R; 315/291; 315/307

(58) Field of Classification Search
None
See application file for complete search history.

(56) References Cited

U.S. PATENT DOCUMENTS

| | | | | |
|---|---|---|---|---|
| 6,020,689 A * | 2/2000 | Gradzki et al. | | 315/224 |
| 6,218,788 B1 | 4/2001 | Chen et al. | | |
| 6,448,713 B1 * | 9/2002 | Farkas et al. | | 315/291 |
| 6,639,369 B2 * | 10/2003 | Ribarich | | 315/307 |
| 6,876,158 B2 * | 4/2005 | Trostl et al. | | 315/291 |
| 7,075,251 B2 | 7/2006 | Chen et al. | | |
| 7,888,886 B2 * | 2/2011 | Wu | | 315/307 |
| 8,102,125 B2 * | 1/2012 | Bucci | | 315/146 |
| 8,339,062 B2 * | 12/2012 | Cencur | | 315/291 |
| 8,405,319 B2 * | 3/2013 | Sadwick et al. | | 315/291 |
| 8,493,002 B2 * | 7/2013 | Van Der Veeken et al. | | 315/307 |

OTHER PUBLICATIONS

NXP, UBA2016A/15/15A 600 V fluorescent lamp driver with PFC, linear dimming and boost function, 2011.*
NXP, Nov. 2011, UBA2016A/15/15A 600 V fluorescent lamp driver with PFC, linear dimming and boost function.*

* cited by examiner

Primary Examiner — Alexander H Taningco
Assistant Examiner — Nelson Correa
(74) Attorney, Agent, or Firm — Thompson Hine LLP

(57) ABSTRACT

An electronic ballast has a rectifying circuit for rectifying an input voltage controlled by a phase dimmer. The electronic ballast has an averaging circuit for averaging current received from the rectifying circuit to produce a reference voltage. The electronic ballast has a control integrated circuit for providing an output current to a compact fluorescent lamp by performing a linear to logarithmic conversion of the reference current, according to a predefined conversion function.

33 Claims, 3 Drawing Sheets

MULTI-LEVEL ADAPTIVE CONTROL CIRCUITRY FOR DEEP PHASE-CUT DIMMING COMPACT FLUORESCENT LAMP

FIELD OF INVENTION

The present disclosure relates to the field of compact fluorescent lamps. More particularly, the present invention relates to an electronic ballast for a compact fluorescent lamp.

BACKGROUND

A triac dimmer installed in series with a power supply and an incandescent lamp in a light circuit, controls how much power is delivered to the lamp and in turn controls how bright the lamp shines. The triac dimmer cuts off a portion of supplied power and allows only a portion of the supplied power to pass to the lamp, depending on the setting of the triac dimmer. Alternating current being delivered to the light circuit from the power supply rapidly fluctuates from positive voltage to negative voltage in the form of a sine wave. The light circuit switches the lamp off and on every time the sine wave switches directions and crosses zero. The triac dimmer is able to control the amount of power being delivered to the lamp by only turning the light circuit back on after the voltage reaches a certain level after crossing zero. The level is defined by the setting of the triac dimmer. In other words, the triac dimmer chops up the supplied voltage. Thus, a user is able to dim an incandescent lamp to a desired brightness by adjusting the triac dimmer.

Compact fluorescent lamps (CFLs) are increasingly popular replacements for incandescent lamps. A CFL uses less power and lasts longer then an incandescent lamp. Dimmable CFLs, such as the early generation 16W R30 Dimmable CFL lamp from TCP has been developed to function similarly to dimmable incandescent lamps. However, known dimmable CFLs do not have the same dimming range as an incandescent lamp. Specifically, known dimmable CFLs do not dim satisfactorily to low levels, such as 20% of full power or less. Additionally, known dimmable CFLs are unable to start at low settings. Instead, a user must move a dimmer to a higher level before restarting the dimmable CFL. Once the CFL is powered up again, the user may then adjust the dimmer back down to a lower setting. Further, known dimmable CFLs have a long light output run up time. It can take 60 second or more for a known dimmable CLF to reach full brightness. Also, known dimmable CFLs have an abrupt dimming curve, in contrast to a smooth and stable dimming curve of an incandescent lamp.

SUMMARY OF THE INVENTION

An electronic ballast has a rectifying circuit for rectifying an input voltage controlled by a phase dimmer. The electronic ballast has an averaging circuit for averaging voltage received from the rectifying circuit to produce a reference voltage. The electronic ballast has a control integrated circuit for providing an output current to a compact fluorescent lamp by performing a linear to logarithmic conversion of the reference voltage, according to a predefined conversion function.

A dimmable discharge lamp has a compact fluorescent lamp and an electronic ballast comprising a multi-level adaptive control circuit for receiving a control signal from a phase dimmer and for providing power to the compact fluorescent lamp based on the control signal. The multilevel adaptive control circuit has an averaging circuit for averaging current received from the rectifying circuit to produce a reference voltage. The multilevel adaptive control circuit has a control integrated circuit for providing an output current to a compact fluorescent lamp by performing a linear to logarithmic conversion of the reference voltage, according to a predefined conversion function.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
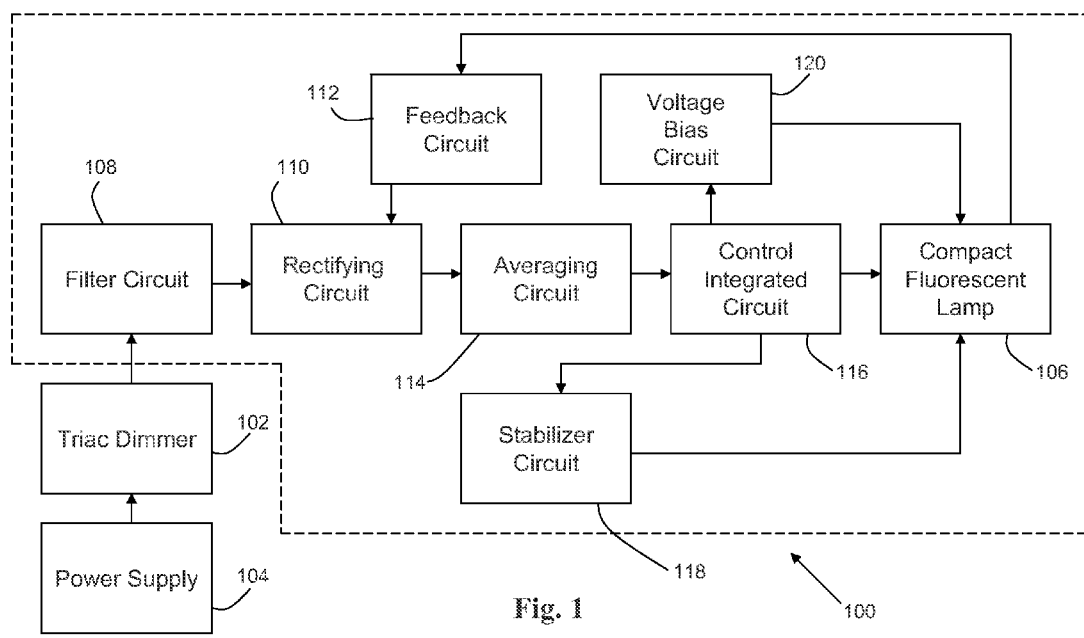
FIG. 1 is an example multilevel adaptive control circuit for a deep phase-cut dimming compact fluorescent lamp.

FIG. 1 is an example multilevel adaptive control circuit 100 for a deep phase-cut dimming compact fluorescent lamp. The multilevel adaptive control circuit 100 is configured to connect to triac dimmer 102 which is adjusted by a user to regulate the amount of power being delivered from power supply 104 to compact fluorescent lamp (CFL) 106. Multilevel adaptive control circuit 100 receives alternating current voltage from power supply 104, via triac dimmer 102.

Multilevel adaptive control circuit 100 has a filter circuit 108 for filtering the alternating current received from power supply 104 and for providing filtered current to rectifying circuit 110. Filter circuit 108 filters out high frequency content back to power line and therefore preventing electromagnetic interference to other devices.

Multilevel adaptive control circuit 100 has a rectifying circuit 110 for rectifying the received current to direct current. In an example embodiment, rectifying circuit 110 is a four diode bridge rectifying circuit.

Multilevel adaptive control circuit 100 has a high frequency feedback circuit 112 for providing feedback to rectifying circuit 110. Without the feedback, rectifying circuit 110 produces a discontinuous input current which results in CFL 106 flickering. The high frequency feedback provided by feedback circuit 112 allows rectifying circuit to conduct without interruption, giving the appearance of a continuous input current to CFL 106.

Multilevel adaptive control circuit 100 has an averaging circuit 114 for averaging the input voltage received via triac dimmer 102. The input voltage is used as a baseline for determining the operating current of to be supplied to CFL 106. Since triac dimmer 102 chops up the input voltage, the input voltage must be averaged in order to establish an accurate baseline.

Multilevel adaptive control circuit 100 has a control integrated circuit 116 to adjust voltage supplied to CFL 106 based on the averaged input voltage received via triac dimmer 102. Control integrated circuit 116 performs a linear to logarithmic conversion of the baseline, or reference voltage by comparing the baseline voltage to voltage derived from the current at CFL 106. Control integrated circuit 116 performs the conversion according to a predefined conversion function which factors in higher sensitivity of the human eye to small changes in light levels. In an example embodiment, control integrated circuit 116 uses an internal conversion table to perform the conversion based on values predefined in the conversion table.

In an example embodiment, control integrated circuit 116 counts the number of ignition attempts of CFL 106. CLF 106 may experience repeated ignition attempts due to line voltage interruption or variances on power supply 104 or at a low dimming setting, for example. If the number of ignition attempts exceeds a predetermined number, control integrated circuit 116 prevents additional ignition attempts, either for a predetermined period of time or until control integrated circuit 116 is reset. This helps prevent CFL 106 from being damaged and also prevents annoying flashing of CFL 106.

In an example embodiment, control integrated circuit 116 overpowers CFL 106 for a predefine time period during startup of CFL 106. For example, control integrated circuit 116 may provide CFL 106 with 150% of required power, or 150% of the power necessary for CFL 106 to reach full brightness. This helps CFL 106 reach full brightness in less time. For example, CFL 106 may reach full brightness in 45 seconds or less. After the predefined time period, control integrated circuit lowers the applied power to CFL 106 back to an intended level at 100%.

In an example embodiment, control integrated circuit 116 automatically bypasses the initial overpowering of CFL 106 when triac dimmer 102 cuts input power provided to CFL 106 to 70% of required power or lower. This enables multilevel adaptive control circuit 100 to dim the CFL 106 without going through overpowering stage.

Figure 3:
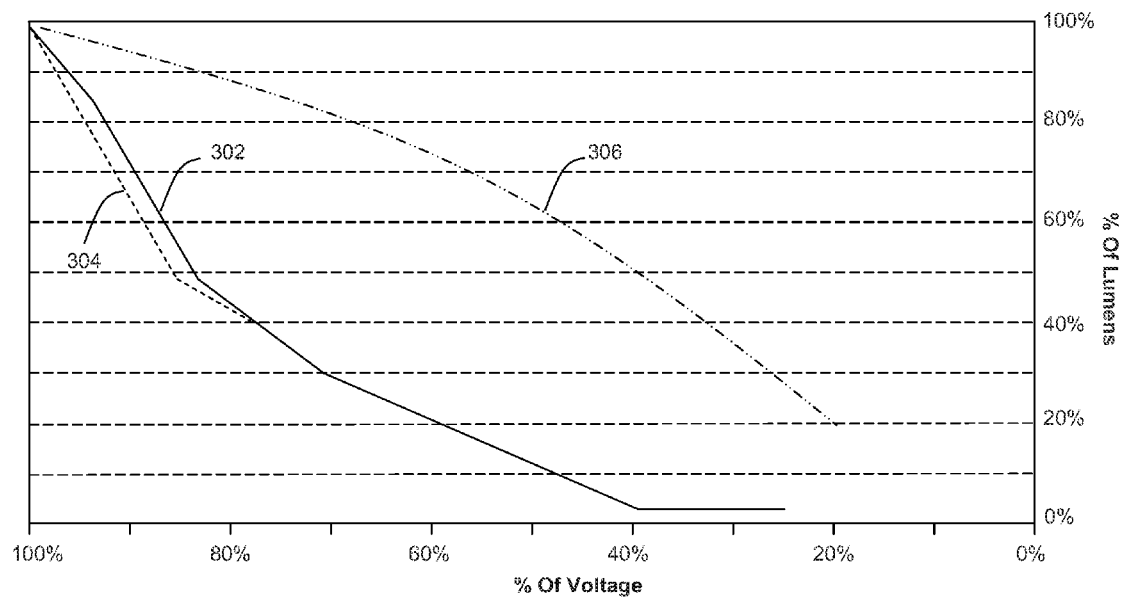
FIG. 3 illustrates a diming curve of an example multilevel adaptive control circuit for a deep phase-cut dimming compact fluorescent lamp.

Multilevel adaptive control circuit 100 has a stabilizer circuit 118 for automatically adjusting gain margin and phase margin in a feedback control loop. In an example embodiment, stabilizer circuit 118 adjusts the gain margin and phase margin based on amplitude and frequency of the close root of the power control circuit. Stabilizer circuit enables multilevel adaptive control circuit 100 to provide a stable current supply to CFL 106 through an entire dimming range even at low dimming setting, which helps eliminate flickering, as illustrated in FIG. 3. FIG. 3 illustrates a diming curve 302 of an example multilevel adaptive control circuit for a deep phase-cut dimming compact fluorescent lamp. In contrast to a diming curve of a known dimmable CFL 306, dimming curve 302 closely resembles a diming curve of an incandescent lamp 304.

Referring back to FIG. 1, multilevel adaptive control circuit 100 has a voltage bias circuit 120 for increasing voltage at CFL 106 as triac dimmer 102 moves into deep dimming. In other words, when triac dimmer 102 is set to a low dimming mode, below 20% for example, voltage bias circuit 120 increases the voltage supplied to CFL 106. This helps ensure that CFL 106 does not shut off when triac dimmer 102 is set to a low dimming mode since the input voltage at that level would otherwise not be sufficient to sustain CLF 106. This also enables multilevel adaptive control circuit 100 to dim CFL 106 down to as low as 2%.

Figure 2:
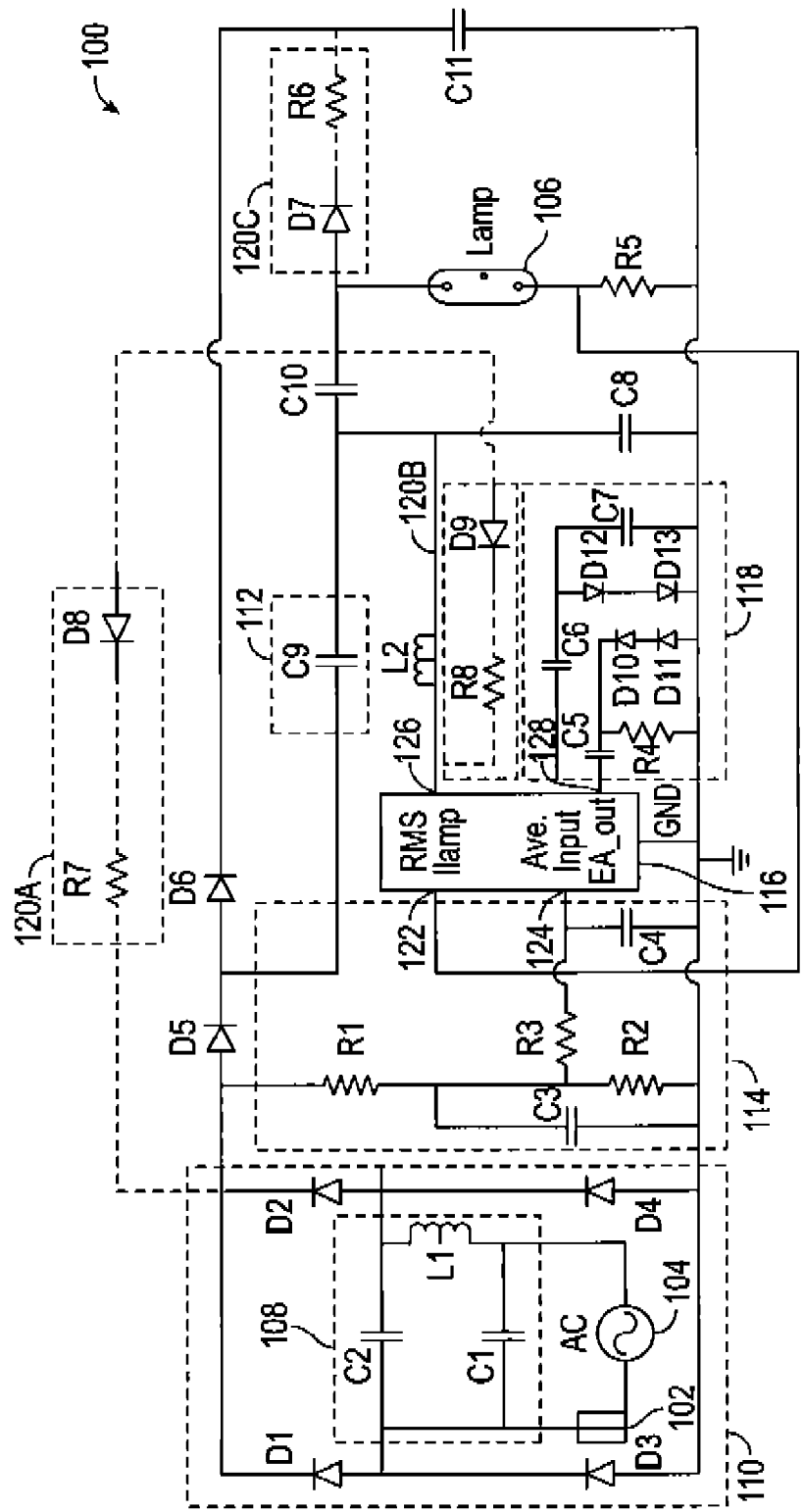
FIG. 2 illustrates in more detail the example multilevel adaptive control circuit for a deep phase-cut dimming compact fluorescent lamp of FIG. 1.

FIG. 2 illustrates in more detail the example multilevel adaptive control circuit 100 for a deep phase-cut dimming compact fluorescent lamp of FIG. 1. Filter circuit 108 is connected in series with power supply 104 and triac dimmer 102. Filter circuit 108 includes capacitors C1 and C2 and inductor L1. Rectifying circuit 110 includes diodes D1, D2, D3, and D4. The four diodes combine to form a four bridge diode circuit for converting supplied AC power to DC power.

Capacitor C11 stores energy for powering CFL 106. Diodes D5 and D6 filter the rectified voltage from rectifying circuit 110 prior to C11 storing the rectified energy.

Feedback circuit 112 consists of capacitor C9 for providing high frequency back to between Diodes D5 and D6. Capacitor C9 forces at less two of the four bridge diode circuit of D1, D2, D3, and D4 to conduct at high frequency on every half line cycle, giving triac dimmer 102 the appearance of a constant load. Thus, C9 helps prevent CFL 106 from flickering.

Control integrated circuit 116 is a power integrated circuit for dimmable compact fluorescent lamps. For example, control integrated circuit 116 may be a custom integrated chip specific to CFL lighting. In the exemplary embodiment as shown in FIG. 2, control integrated circuit 116 may include an RMS pin 122, an average input pin 124, a lamp pin 126, and an output pin 128. RMS pin 122 of control integrated circuit 116 detects current at CFL 106, as represented by resistor R5, and compares the current to a baseline input voltage. The baseline voltage is an average voltage, based on the chopped up wave form generated by triac dimmer 102, received from averaging circuit 114. Averaging circuit 114 produces the baseline voltage by calculating an RMS of the current received from the rectifying circuit 110. Averaging circuit 114 includes resistors R1, R2, and R3, as well as capacitors C3 and C4. Control integrated circuit 116 is able to adjust current supplied to CFL 106 by comparing the baseline voltage with the current at resistor R5 and performing a linear to logarithmic conversion of the baseline current.

Stabilizing circuit 118 has two diodes D10 and D11 in series with one another and in parallel with resistor R4 and two diodes D12 and D13 in series with one another then in parallel with capacitor C7. Diodes D10 and D11 conduct voltage opposite to the direction that diodes D12 and D13 conduct voltage. Based on output received from control integrated circuit 116, diodes D10 and D11 will either conduct current or block current from flowing. Similarly, Diodes D12 and D13 will either conduct current or block current from flowing. Depending on whether diodes D10 and D11, as well as D12 and D13, are conducting or blocking current, gain and phase margin of multilevel adaptive control circuit 100 changes accordingly. Since diodes D10 and D11 conduct voltage opposite to the direction that diodes D12 and D13 conduct voltage, the combination of diodes D10-D13 indirectly creates a multilevel control circuit for automatically controlling gain and phase margin.

Voltage bias circuit 120 includes a diode and a resistor for increasing the voltage available to CFL 106 as triac dimmer 102 is set to a low dimming setting and as the lamp operating voltage raises. In an example embodiment, voltage bias circuit 120a comprises diode D8 and resistor R7 in series and connected with rectifying circuit 110 and parallel to inductor L2. In an example embodiment, voltage bias circuit 120b comprises diode D9 and resistor R8 in series and connected to capacitor C10 at one end and connected to inductor L2 at another end. In an example embodiment, voltage bias circuit 120c comprises diode D7 and resistor R6 connected to capacitor C10 at one end and connected to capacitor C11 at another end. Capacitor C5 is connected in series with resistor R4 for DC blocking Capacitor C6 is connected in series with capacitor C7 to determine large signal AC gain and phase margin.

As a result of the bias voltage introduced to CFL 106, multilevel adaptive control circuit 100 is capable of dimming CFL 106 down to 2% and maintain stability throughout a dimming curve of CFL 106. Additionally, multilevel adaptive control circuit 100 reduces the run up time of CFL 106 to less than 45 seconds. Multilevel adaptive control circuit 100 is also capable of starting CFL 106 at a low dimming setting, and thus eliminating the need to slide the dimmer to a higher setting before powering up CFL 106, as is done with a conventional dimmable CFL. Multilevel adaptive control circuit 100 also helps eliminate flickering of CFL 106.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

Some portions of the detailed descriptions are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. An electronic ballast comprising:
   a rectifying circuit for rectifying an input voltage controlled by a phase dimmer;
   an averaging circuit for averaging current received from the rectifying circuit to produce a reference voltage, wherein the averaging circuit produces the reference voltage by calculating an RMS current of the current received from the rectifying circuit; and
   a control integrated circuit for providing an output current to a compact fluorescent lamp by performing a linear to logarithmic conversion of the reference voltage, according to a predefined conversion function, the control integrated circuit configured to overpower the compact fluorescent lamp, at a power level above a required power level for the compact fluorescent lamp to achieve full brightness, for a predefine time period, and configured to bypass the overpowering of the compact fluorescent lamp responsive to determining that the input voltage is below a predetermined value.

2. The electronic ballast of claim 1, further comprising a stabilizer circuit for automatically adjusting gain margin and phase margin in a feedback control loop.

3. The electronic ballast of claim 1, further comprising a voltage bias circuit for increasing voltage at the compact fluorescent lamp responsive to determining that the input voltage is less than a predetermined voltage.

4. The electronic ballast of claim 1, wherein the control integrated circuit performs the linear to logarithmic conversion of the reference voltage by comparing the reference voltage to a current across the compact fluorescent lamp.

5. The electronic ballast of claim 1, wherein the control integrated circuit comprises a starting counter circuit for counting a total number of ignition attempts of the compact fluorescent lamp and for preventing an ignition attempt responsive to determining the total number of ignition attempts exceeds a predetermined number.

6. The electronic ballast of claim 2, wherein the stabilizer circuit comprises a multileveled adaptive circuit, the multilevel adaptive circuit comprising:
   a first circuit level; and
   a second circuit level;
   wherein the first circuit level is configured to conduct voltage in a positive direction; and
   wherein the second circuit level is configured to conduct voltage in a negative direction.

7. The electronic ballast of claim 6, wherein the first circuit level comprises a first diode connected in series with a second diode, the first and second diodes connected in parallel with a resistor; and wherein the second circuit level comprises a third diode connected in series with a fourth diode, the third and fourth diodes connected in parallel with a capacitor.

8. The electronic ballast of claim 2, wherein the stabilizer circuit automatically adjusts gain margin and phase margin in a feedback control loop, based on at least one of the amplitude and the frequency of input provided by a power supply.

9. The electronic ballast of claim 3, wherein the voltage bias circuit comprises a resistor connected in series with a diode.

10. The electronic ballast of claim 9, wherein the resistor is further connected in parallel with the rectifying circuit.

11. A dimmable discharge lamp comprising:
    a compact fluorescent lamp;
    an electronic ballast comprising a multi-level adaptive control circuit for receiving a control input from a phase dimmer and for providing power to the compact fluorescent lamp based on the control input, wherein the multilevel adaptive control circuit comprises:
    a rectifying circuit for rectifying an input voltage controlled by the phase dimmer;
    an averaging circuit for averaging current received from the rectifying circuit to produce a reference voltage, wherein the averaging circuit produces the reference voltage by calculating an RMS current of the current received from the rectifying circuit; and
    a control integrated circuit for providing an output current to the compact fluorescent lamp by performing a linear to logarithmic conversion of the reference voltage, according to a predefined conversion function, the control integrated circuit configured to overpower the compact fluorescent lamp, at a power level above a required power level for the compact fluorescent lamp to achieve full brightness, for a predefine time period, and configured to bypass the overpowering of the compact fluorescent lamp responsive to determining that the input voltage is below a predetermined value.

12. The dimmable discharge lamp of claim 11, wherein the multilevel adaptive control circuit further comprises a stabilizer circuit for automatically adjusting gain margin and phase margin in a feedback control loop.

13. The dimmable discharge lamp of claim 11, wherein the multilevel adaptive control circuit further comprises a voltage bias circuit for increasing voltage at the compact fluorescent lamp responsive to determining that the input voltage is less than predetermined voltage.

14. The dimmable discharge lamp of claim 11, wherein the control integrated circuit performs the linear to logarithmic conversion of the reference voltage by comparing the reference voltage to a current across the compact fluorescent lamp.

15. The dimmable discharge lamp of claim 11, wherein the control integrated circuit comprises a starting counter circuit for counting a total number of ignition attempts of the compact fluorescent lamp and for preventing an ignition attempt responsive to determining the total number of ignition attempts exceeds a predetermined number.

16. The dimmable discharge lamp of claim 12, wherein the stabilizer circuit comprises:
a first circuit level; and
a second circuit level;
wherein the first circuit level is configured to conduct voltage in a positive direction; and
wherein the second circuit level is configured to conduct voltage in a negative direction.

17. The discharge lamp of claim 16, wherein the first circuit level comprises a first diode connected in series with a second diode, the first and second diodes connected in parallel with a resistor; and wherein the second circuit level comprises a third diode connected in series with a fourth diode, the third and fourth diodes connected in parallel with a capacitor.

18. The dimmable discharge lamp of claim 12, wherein the stabilizer circuit automatically adjusts gain margin and phase margin in a feedback control loop, based on at least one of the amplitude and the frequency of input provided by a power supply.

19. The dimmable discharge lamp of claim 13, wherein the voltage bias circuit comprises a resistor connected in series with a capacitor.

20. An electronic ballast comprising:
a rectifying circuit for rectifying an input voltage controlled by a phase dimmer;
an averaging circuit for averaging current received from the rectifying circuit to produce a reference voltage;
a control integrated circuit for providing an output current to a compact fluorescent lamp by performing a linear to logarithmic conversion of the reference voltage, according to a predefined conversion function; and
a stabilizer circuit for automatically adjusting gain margin and phase margin in a feedback control loop, wherein the stabilizer circuit comprises a multileveled adaptive circuit, the multilevel adaptive circuit comprising:
a first circuit level; and
a second circuit level;
wherein the first circuit level is configured to conduct voltage in a positive direction; and
wherein the second circuit level is configured to conduct voltage in a negative direction.

21. The electronic ballast of claim 20, wherein the averaging circuit produces the reference voltage by calculating an RMS current of the current received from the rectifying circuit.

22. An electronic ballast comprising:
a rectifying circuit for rectifying an input voltage controlled by a phase dimmer;
an averaging circuit for averaging current received from the rectifying circuit to produce a reference voltage;
a control integrated circuit for providing an output current to a compact fluorescent lamp by performing a linear to logarithmic conversion of the reference voltage, according to a predefined conversion function; and
a stabilizer circuit for automatically adjusting gain margin and phase margin in a feedback control loop, wherein the stabilizer circuit comprises a multileveled adaptive circuit, the multilevel adaptive circuit comprising:
a first circuit level, wherein the first circuit level comprises a first diode connected in series with a second diode, the first and second diodes connected in parallel with a resistor; and
a second circuit level, wherein the second circuit level comprises a third diode connected in series with a fourth diode, the third and fourth diodes connected in parallel with a capacitor;
wherein the first circuit level is configured to conduct voltage in a positive direction; and
wherein the second circuit level is configured to conduct voltage in a negative direction.

23. The electronic ballast of claim 22, wherein the averaging circuit produces the reference voltage by calculating an RMS current of the current received from the rectifying circuit.

24. An electronic ballast comprising:
a rectifying circuit for rectifying an input voltage controlled by a phase dimmer;
an averaging circuit for averaging current received from the rectifying circuit to produce a reference voltage;
a control integrated circuit for providing an output current to a compact fluorescent lamp by performing a linear to logarithmic conversion of the reference voltage, according to a predefined conversion function; and
a stabilizer circuit for automatically adjusting gain margin and phase margin in a feedback control loop, wherein the stabilizer circuit automatically adjusts gain margin and phase margin in a feedback control loop, based on at least one of the amplitude and the frequency of input provided by a power supply.

25. The electronic ballast of claim 24, wherein the averaging circuit produces the reference voltage by calculating an RMS current of the current received from the rectifying circuit.

26. A dimmable discharge lamp comprising:
a compact fluorescent lamp;
an electronic ballast comprising a multi-level adaptive control circuit for receiving a control input from a phase dimmer and for providing power to the compact fluorescent lamp based on the control input, wherein the multilevel adaptive control circuit comprises:
a rectifying circuit for rectifying an input voltage controlled by the phase dimmer;
an averaging circuit for averaging current received from the rectifying circuit to produce a reference voltage;
a control integrated circuit for providing an output current to the compact fluorescent lamp by performing a linear to logarithmic conversion of the reference voltage, according to a predefined conversion function; and
a stabilizer circuit for automatically adjusting gain margin and phase margin in a feedback control loop, wherein the stabilizer circuit comprises:

a first circuit level; and
a second circuit level;
wherein the first circuit level is configured to conduct voltage in a positive direction; and
wherein the second circuit level is configured to conduct voltage in a negative direction.

27. The dimmable discharge lamp of claim 26, wherein the averaging circuit produces the reference voltage by calculating an RMS current of the current received from the rectifying circuit.

28. A dimmable discharge lamp comprising:
a compact fluorescent lamp;
an electronic ballast comprising a multi-level adaptive control circuit for receiving a control input from a phase dimmer and for providing power to the compact fluorescent lamp based on the control input, wherein the multilevel adaptive control circuit comprises:
a rectifying circuit for rectifying an input voltage controlled by the phase dimmer;
an averaging circuit for averaging current received from the rectifying circuit to produce a reference voltage;
a control integrated circuit for providing an output current to the compact fluorescent lamp by performing a linear to logarithmic conversion of the reference voltage, according to a predefined conversion function; and
a stabilizer circuit for automatically adjusting gain margin and phase margin in a feedback control loop, wherein the stabilizer circuit comprises:
a first circuit level, wherein the first circuit level comprises a first diode connected in series with a second diode, the first and second diodes connected in parallel with a resistor; and
a second circuit level, wherein the second circuit level comprises a third diode connected in series with a fourth diode, the third and fourth diodes connected in parallel with a capacitor;
wherein the first circuit level is configured to conduct voltage in a positive direction; and
wherein the second circuit level is configured to conduct voltage in a negative direction.

29. The dimmable discharge lamp of claim 28, wherein the averaging circuit produces the reference voltage by calculating an RMS current of the current received from the rectifying circuit.

30. A dimmable discharge lamp comprising:
a compact fluorescent lamp;
an electronic ballast comprising a multi-level adaptive control circuit for receiving a control input from a phase dimmer and for providing power to the compact fluorescent lamp based on the control input, wherein the multilevel adaptive control circuit comprises:
a rectifying circuit for rectifying an input voltage controlled by the phase dimmer;
an averaging circuit for averaging current received from the rectifying circuit to produce a reference voltage;
a control integrated circuit for providing an output current to the compact fluorescent lamp by performing a linear to logarithmic conversion of the reference voltage, according to a predefined conversion function; and
a stabilizer circuit for automatically adjusting gain margin and phase margin in a feedback control loop, wherein the stabilizer circuit automatically adjusts gain margin and phase margin in a feedback control loop, based on at least one of the amplitude and the frequency of input provided by a power supply.

31. The dimmable discharge lamp of claim 30, wherein the averaging circuit produces the reference voltage by calculating an RMS current of the current received from the rectifying circuit.

32. An electronic ballast comprising:
a rectifying circuit for rectifying an input voltage controlled by a phase dimmer;
an averaging circuit for averaging current received from the rectifying circuit to produce a reference voltage; and
a control integrated circuit for providing an output current to a compact fluorescent lamp by performing a linear to logarithmic conversion of the reference voltage, according to a predefined conversion function, the control integrated circuit configured to overpower the compact fluorescent lamp, at a power level above a required power level for the compact fluorescent lamp to achieve full brightness, for a predefine time period, and configured to bypass the overpowering of the compact fluorescent lamp responsive to determining that the input voltage is below a predetermined value.

33. A dimmable discharge lamp comprising:
a compact fluorescent lamp;
an electronic ballast comprising a multi-level adaptive control circuit for receiving a control input from a phase dimmer and for providing power to the compact fluorescent lamp based on the control input, wherein the multilevel adaptive control circuit comprises:
a rectifying circuit for rectifying an input voltage controlled by the phase dimmer;
an averaging circuit for averaging current received from the rectifying circuit to produce a reference voltage; and
a control integrated circuit for providing an output current to the compact fluorescent lamp by performing a linear to logarithmic conversion of the reference voltage, according to a predefined conversion function, the control integrated circuit configured to overpower the compact fluorescent lamp, at a power level above a required power level for the compact fluorescent lamp to achieve full brightness, for a predefine time period, and configured to bypass the overpowering of the compact fluorescent lamp responsive to determining that the input voltage is below a predetermined value.

* * * * *